Aug. 9, 1927.  
J. W. FRENCH ET AL  
1,638,482  
COLLAR LEAK CLAMP  
Filed Feb. 4, 1926  
2 Sheets-Sheet 1
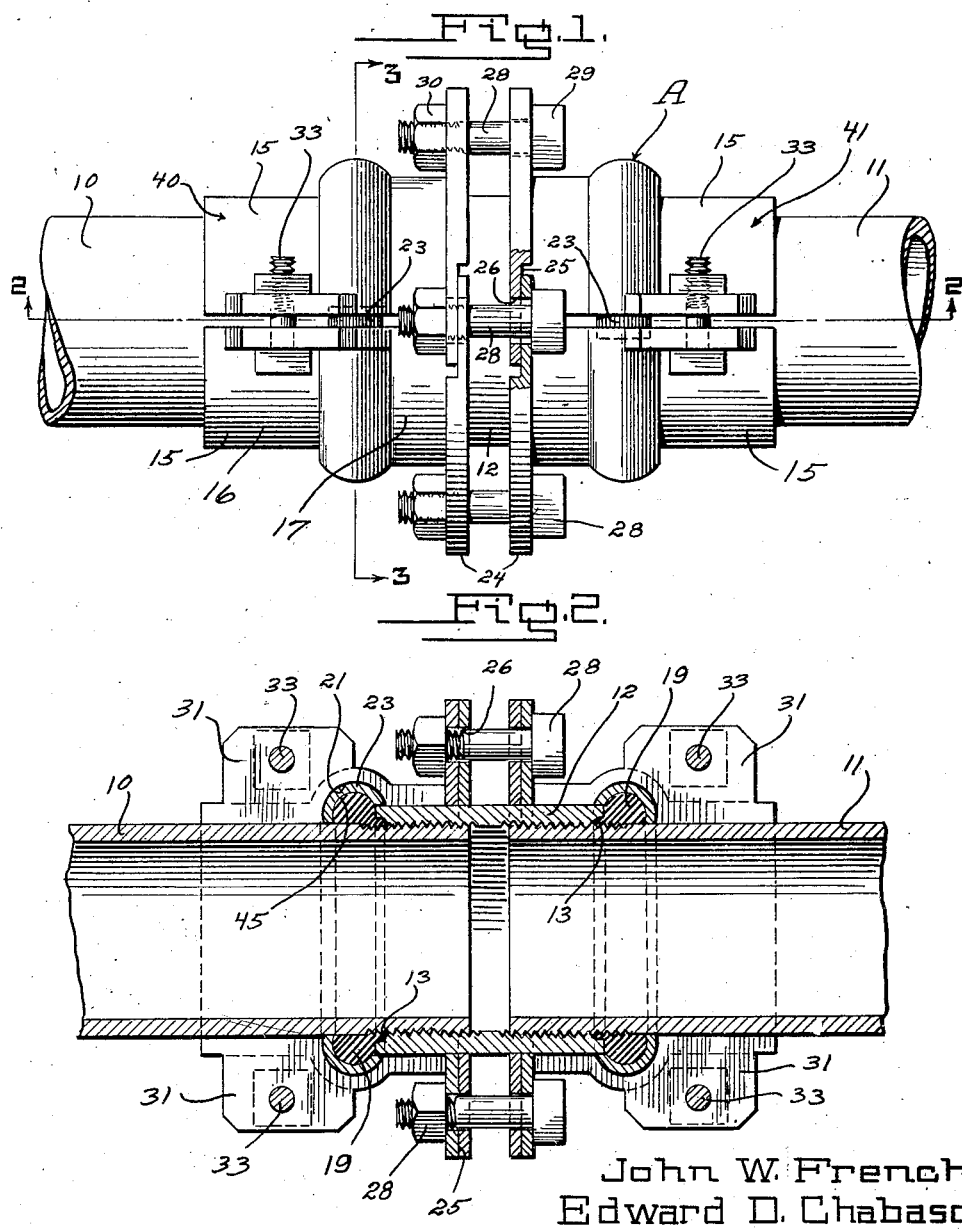
John W. French  
Edward D. Chabasol  
Inventors Aug. 9, 1927.  
J. W. FRENCH ET AL  
1,638,482  
COLLAR LEAK CLAMP  
Filed Feb. 4, 1926  
2 Sheets-Sheet 2

John W. French  
Edward D. Chabasol  
Inventor

Patented Aug. 9, 1927.

1,638,482

UNITED STATES PATENT OFFICE.

JOHN W. FRENCH AND EDWARD D. CHABASOL, OF WILSON, OKLAHOMA.

COLLAR LEAK CLAMP.

Application filed February 4, 1926. Serial No. 86,016.

The present invention relates to improvements in couplings for pipe lines, and more particularly to an improved clamp for preventing leaking at the couplings of the line.

The primary object of the invention being to provide an improved collar leak clamp particularly well adapted for use in connection with coupling collars as used upon oil lines or high or low pressure lines.

A further object of the invention is to provide an improved collar leak clamp which when applied to the coupling collar of a pipe line will effectively stop all leaks at the collar, and which clamp will serve as a permanent repair for the leaks.

A still further object of the invention is to provide a device for attachment to a coupling collar of a pipe line in a manner so that all liability of leaking past the collar is eliminated by means of packing gaskets which are forced into binding engagement at each end of the collar during the process of clamping the device about the collar.

A still further object of the invention is to provide an improved collar leak clamp formed of similarly shaped sections so constructed that any four of the sections when assembled will form a complete clamp, thus eliminating the necessity of sorting or pairing when assembling the sections into a complete clamp.

A still further object of the invention is to provide an improved collar leak clamp constructed in such a manner as to permit of its being used upon both high and low pressure lines and which clamp will allow for the expansion and contraction of the line to which it is applied.

Other objects and advantages of the invention will be apparent during the course of the following detail description, taken in connection with the accompanying drawings forming a part of this specification and in which drawings:

Figure 1 is a view in side elevation of the improved clamp, shown in position about the coupling of two pipe sections.

Figure 2 is a central longitudinal section taken on line 2—2 of Figure 1.

Figure 3:
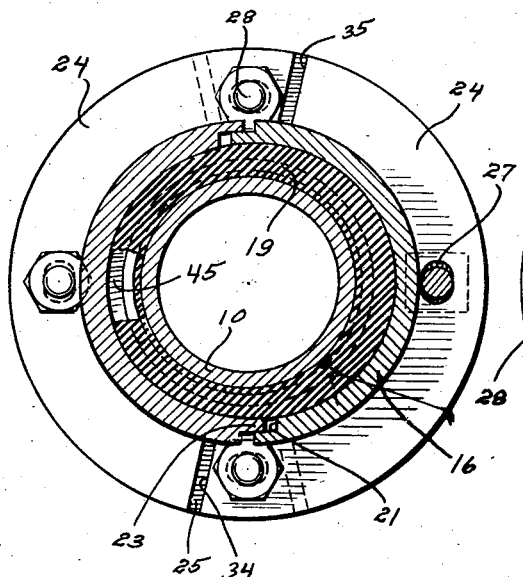
Figure 3 is a transverse section on line 3—3 of Figure 1, looking in the direction of the arrows.

In the drawings, and wherein similar reference characters designate corresponding parts throughout the several views, 10 and 11 may designate the meeting ends of two pipe sections, having their ends threaded for receiving a conventional type of coupling collar 12. The opposite ends of the coupling collar 12 are provided with the usual annular recesses 13 which are disposed inwardly of the ends of the collar as illustrated in Figure 2. These annular recesses 13 provide an annular pocket at each end of the collar when in position for connecting the pipe sections 10 and 11.

Referring particularly now to the improved clamp, and which may be designated as a whole by the letter A, the same is preferably formed of four interfitting and locking sections 15, and which sections are each of similar formation and preferably made of maleable iron. Since each of the sections 15 are of identical configuration, it is believed that a description of one of the sections will suffice.

Each of the sections 15, and which are semi-circular shape in cross section, are formed with outer or minor body portions 16 of an internal diameter substantially equal to the external diameter of the pipe upon which the clamp is to be disposed, and an inner or major body portion 17, of a larger internal diameter than the minor body portion 16 and of a diameter substantially equal to the external diameter of the coupling collar about which the clamp is to be disposed. The portion 16 therefor forms a pipe engaging portion, while the portion 17 forms a collar engaging portion. Provided at the juncture of the sections 16 and 17, is a packing groove 18 of segmental shape in cross section, and which groove when the sections 15 are in assembled relation provides an annular groove for receiving a package gasket 19. Provided in the abutting face 20 of each section 15 and at one end of the groove 18, is an arcuate shaped recess 21, while the abutting face 22 of each section is provided with a segmental shaped lip 23. The step of the recess 21 and the length of the lip 23 circumferentially of the sections are the same, so that the abutting faces of the sections may be drawn into contacting relation with one another if such should be required. These recesses 21 and lips 23 serve to provide a lap joint at the ends of the packing grooves 18 for providing a continuous housing for the gasket 19 when the sections are in assembled relation about the pipe and coupling collar.

Formed at the inner end of each of the sections 15, are radially extending circumferential flanges 24 having their ends oppositely rabbeted as at 25, and extending for a slight distance past the abutting faces 20 and 22 of the sections. Each of the overlying rabbeted ends of the flanges 24 are provided with elongated apertures 26 having their major dimensions extending circumferentially of the flanges, and having their axes extending in parallel relation with the abutting faces 20 and 22. Provided in the flanges 24 between the rabbeted ends 25, are elongated apertures 27 which extend in a like direction as do the elongated apertures 26. These apertures 26 and 27, when the sections 15 are in assembled relation as in Figure 1, are adapted to align for receiving the draw bolts 28 which extend in parallel longitudinal relation with the collar 12. These draw bolts 28 are preferably provided with square heads 29 which extend into close proximity with the external surface of the collar engaging portion 17, so that upon turning of the nuts 30 upon the threaded shank of the bolt, the head 29 will prevent rotation of the bolt. As will be observed, the draw bolt which extends through the terminally disposed apertures 26, serves for retaining the sections 15 in assembled relation, and during the assemblying of the clamp, one of the bolts may be passed through the aligned terminal apertures 26 for acting as a hinge joint for the sections.

Formed at the abutting edges of the outer or pipe engaging portions 16, are radially extending ears 31 provided with apertures 32 which when the sections are assembled will align for receiving clamping bolts 33. These clamping bolts 33 which extend in tangential relation to the sections 15, serve for contracting the sections circumferentially about the pipe sections 10 and 11 and the collar 12. It may here be well to state that the circumferentially extending flanges 24 will act as a stiffening means for the inner ends of the sections when the clamping bolts 33 are turned for drawing the sections into frictional contact with the pipe sections and collar, and thus prevent liability of the inner ends of the sections not contracting equally with the outer ends of the sections through which the clamping bolts extend.

Figure 4:
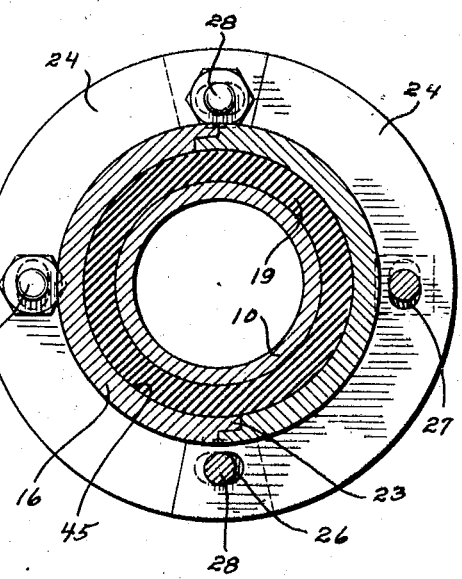
Figure 4 is a transverse section taken on a line such as Figure 3, and showing the relative positions of the parts of the clamp when employed in connection with a high pressure line.
Figure 5:
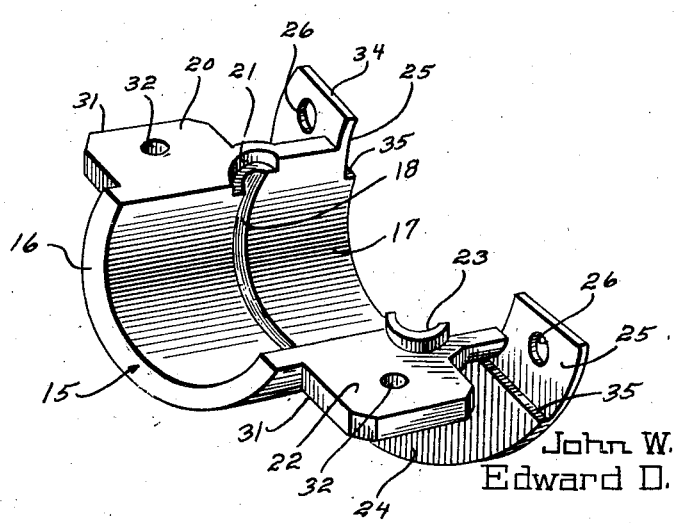
Figure 5 is a perspective view of one of the main body sections of the clamp.

As will be observed in Figure 3, the terminally disposed edges 34 of the flanges 24, as well as the seats or shoulders 35 formed by the rabbets 25, extend in a plane intersecting the axis of the tubular sleeve formed by the sections. With such construction, it will be seen that in Figure 4 that the end edges 34 will seat flush upon the shoulders 35 when the clamp is being used upon high pressure lines. The elongated apertures 26 and 27 through which the draw bolts 28 extend, will allow for the sections to be drawn together in a position as illustrated in Figure 4.

When any four of the sections 15 are assembled in interlocking engagement as in Figure 1, the same will provide a pair of cooperating sleeve sections 40 and 41, each sleeve section adapted to be contracted circumferentially by the clamping bolts 33, and drawn toward one another longitudinally of the pipe sections 10 and 11 as by the draw bolts 28. This circumferential contraction and lateral shifting of the sleeve sections 40 and 41 as by the bolts 33 and 28 respectively, will force the packing gaskets 19 into tight engagement with and under the ends of the collar 12, in a manner for effectively sealing the ends of the collar against possible leakage. Such compressing of the packing gaskets is effectively accomplished by means of the segmental shaped annular cavity 45 formed by the packing grooves 18.

In assembling the clamp about the collar 12, the sections 15 may be loosely held in assembled relation as by the draw bolts 28, after which the clamping bolts 33 may be passed through the aligned apertures 32 and drawn tight for contracting the sleeves 40 and 41 and pressing the packing gasket 19 into tight engagement with the outer surface of the pipe sections 10 and 11. The draw bolts 28 may then be tightened for drawing the sleeve sections toward one another and pressing the packing 19 into tight engagement with the ends of the collar and forcing a portion of the packing into the annular recesses 13 formed inwardly at each end of the collar.

While but four of the draw bolts 28 have been shown, additional draw bolts may be added in accordance with the size and specific use to which the clamp is intended to be used.

While the clamp has been shown in connection with "screw lines", that is, lines wherein the ends of the pipe sections are threaded, the same may be also effectively used in connection with pipe lines wherein the ends of the pipe sections are plain with a smooth sleeve overlapping the abutting ends of the pipe sections.

From the foregoing description it will be seen that an efficient collar leak clamp has been provided which will effectively and permanently stop leaks at the coupling collars of the pipe line, such leaks being caused by the pipes pulling apart due to expansion or any other cause. It will be further observed that a novel collar leak clamp has been provided formed of a number of identically formed sections, thus permitting of quick assembling of the clamp without the necessity of sorting or pairing different sections in order to form the clamp, and which sections when in assembled relation may be effectively clamped about the coupling collar for providing a permanent leak clamp for the collar.

Changes in detail may be made to the specific form of the invention herein shown and described, without departing from the spirit of the invention or the scope of the following claims.

We claim:

1. In a collar leak clamp, the combination of a pair of longitudinally divided sleeve sections having inwardly formed annular cavities for receiving a packing gasket, circumferentially extending flanges formed at the inner end of each sleeve section having their ends extending past the meeting edges of the divided sleeve sections and provided with aligned elongated apertures having their major dimension extending in a circumferential direction, bolts extending through the apertures in said flanges, serving to retain the divided sleeve sections in assembled relation and for moving the sleeve sections toward one another, and means for contracting the sleeve sections circumferentially.

2. In a collar leak clamp, the combination of a pair of cooperating sleeve sections each embodying a semi-circular shaped section having an outer pipe engaging portion and an inner collar engaging portion of greater internal diameter than the pipe engaging portion, an arcuate shaped packing groove provided inwardly of the section at the juncture of the pipe and collar engaging portions, an arcuate shaped recess formed at one end of the packing groove, a segmental shaped lip provided at the opposite end of the packing groove for fitting in the recess of its companion section, means connecting the semi-circular sections for providing sleeve sections, and means for drawing the sleeve sections toward one another when positioned about collar connected pipe sections.

JOHN W. FRENCH.
EDWARD D. CHABASOL.